Figure 1:
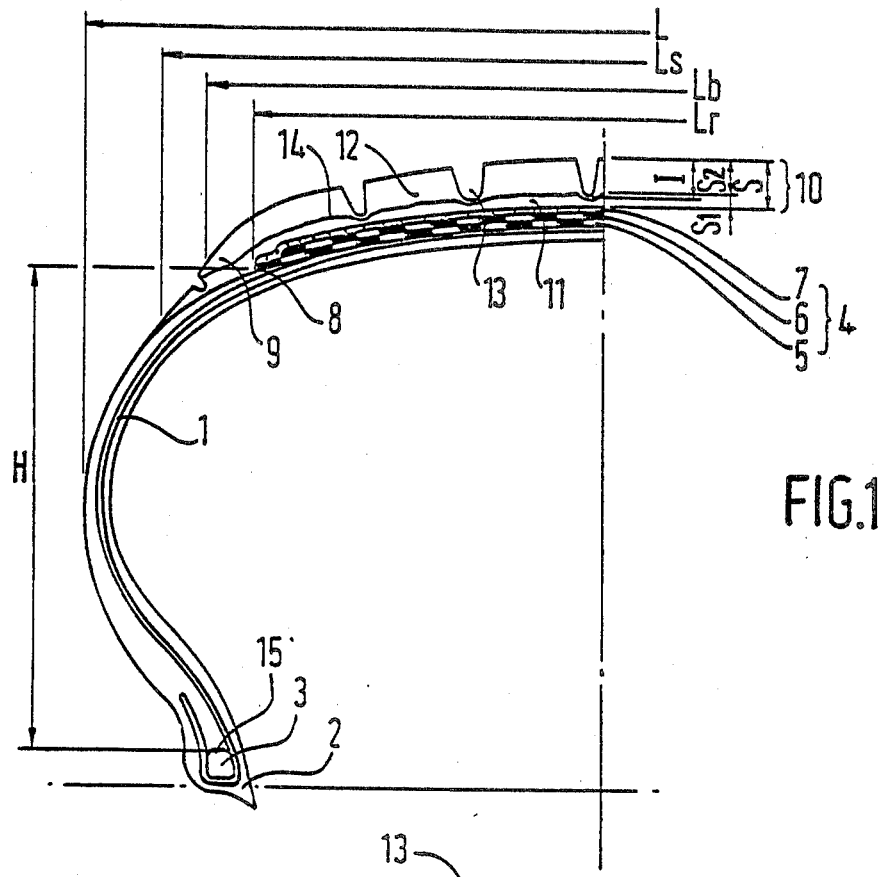

United States Patent [19]

Bandel et al.

[11] 4,407,346

[45] Oct. 4, 1983

[54] PNEUMATIC TIRE FOR MOTOR VEHICLES HAVING A LOW POWER ABSORPTION AND A HIGH DIRECTIONAL CONTROL STABILITY

[75] Inventors: Paolo Bandel, Milan; Renato Caretta, Viale dei Tigli, both of Italy

[73] Assignee: Industrie Pirelli S.p.A., Milan, Italy

[21] Appl. No.: 211,843

[22] Filed: Dec. 1, 1980

[30] Foreign Application Priority Data

Dec. 12, 1979 [IT] Italy ................... 7221 A/79

[51] Int. Cl.³ .......................... B60C 1/00; B60C 3/00; B60C 11/00
[52] U.S. Cl. ......................... 152/209 R; 152/330 R; 152/360; 152/374
[58] Field of Search ............. 152/330 R, 360, 374 R, 152/209 R, 353 R

[56] References Cited

U.S. PATENT DOCUMENTS 3,157,218 11/1964 Brown .................... 152/330 R
3,759,306 9/1973 Greiner et al. ............ 152/374
4,076,066 2/1978 Verdier ..................... 152/353 R Primary Examiner—Edward C. Kimlin
Assistant Examiner—Lois E. Boland
Attorney, Agent, or Firm—Stevens, Davis, Miller & Mosher

[57] ABSTRACT

A pneumatic tire for motor vehicles having a low power absorption and a high directional control stability is disclosed. The tire has a tread formed by two superimposed elastomeric layers and has a H/L ratio of less than 0.6; H is the sidewall height and L is the width of the tire section.

7 Claims, 2 Drawing Figures

PNEUMATIC TIRE FOR MOTOR VEHICLES HAVING A LOW POWER ABSORPTION AND A HIGH DIRECTIONAL CONTROL STABILITY

The present invention relates to a radial pneumatic tire for motor vehicles and, more particularly, to such tires in which the carcass cords extend from one head to the other, forming an angle of 90°, or only slightly different from 90°, with respect to the mid-circumferential plane of the tire.

The present invention is especially related to a radial tire which has reduced resistance to rolling over the road surface than that of conventional tires, and therefore a lower power absorption, which in turns results in reduced fuel consumption by the motor vehicle.

It is known that a relevant portion of the power absorption of the whole tire is to be attributed to the tread, owing to the complex interaction which occurs between the tread and the road surface.

To reduce this power absorption, it has been proposed to provide tread patterns of different designs or to use elastomeric compositions which have low hysteretic loss; however, the heretofore proposed solutions to the problem which have improved the consumption have introduced other problems with the fundamental characteristics of a reliable tire such as, for instance, increased tread wear and reduced traction on dry and wet road surfaces, et cetera.

In order to avoid increased tread wear and reduction in traction a composite tire, formed by two layers of tire building compound radially superimposed one on the other have been proposed with the radially outermost layer forming the blocks and grooves of the tread pattern being characterized by having a good resistance to abrasion, tear and cracks and by good traction on both dry and wet ground, and the radially innermost layer having a low hysteretic loss.

This solution of the problem provides a tread of the so-called "cap and base" type, and appears to have given good results with respect to tire power absorption, without substantial reduction in mileage due to wear and tear of the tread, and insuring, moreover, good traction on both dry and wet road surfaces. However, it has been noted that such tires have a low resistance to transverse forces acting on them, for instance, during cornering which causes problems in controlling tire directions particularly when the tire is running at a high speed.

This low resistance to transverse forces is probably due to the fact that the low hysteretic loss of the radially innermost layer of the tread is often accompanied by a larger deformation because of the stresses acting upon it.

It has now been found that it is possible to obtain a further reduction in power absorption in a pneumatic tire provided with a tread of the "cap and base" type by acting on the geometrical configuration of the carrying structure of the tire itself, and that such a modification may also improve the directional control stability characteristics of the tire.

It is therefore an object of the present invention to provide a pneumatic tire having improved power absorption and directional control stability. Another object of the invention is to provide a pneumatic tire having a radial carcass for motor vehicle wheels which absorbs less lower power as it is rolled over the road surface than prior art radial type pneumatic motor vehicle tires and does not interfere significantly with the steering of the vehicle on which it is mounted. Still another object of the invention is to provide a pneumatic motor vehicle tire having radial cords and a tread band which absorbs less power than conventional prior art radial type tires and imparts good steering characteristics to the tire.

Figure 2:
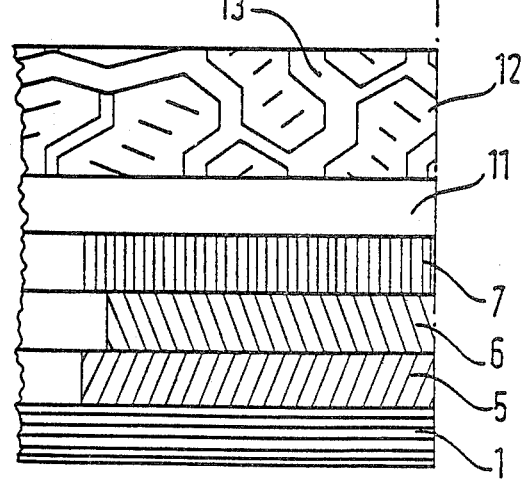

Other objects will become apparent from the following description with reference to the accompanying drawing wherein:

FIG. 1 illustrates in a one-half cross-section one embodiment of the invention having a symmetrical cross-section and a preferred annular reinforcing structure for the tread band; and FIG. 2 is a plan view of a portion of the tread of the embodiment illustrated in FIG. 1.

The foregoing objects and others are accomplished in accordance with this invention, generally speaking, by providing a pneumatic tire for motor vehicle wheels having a carcass of radial cords, two axially spaced sidewalls whose maximum distance apart in the axial direction determines the section width of the tire, two beads each of which has at least one bead core around which are wound-up the cords of the carcass, a tread disosed at the carcass top, a cicumferentially inextensible annular reinforcing structure radially interposed between the tread and carcass, the annular reinforcing structure having a width which is substantially equal to that of the tread and having its lateral edges lying at the tread shoulders, the tread having two layers of different rubber compositions or compounds radially superimposed one on the other, the tire being characterized in that the rubber composition forming the radially innermost layer has an index of hysteretic loss which is not higher than 0.010 Joule for each cubic centimeter of composition at a temperature at 25° C. and not higher than 0.006 Joule for each cubic centimeter of composition at a temperature of 70° C., the ratio between the radial distance of the lateral ends of the annular reinforcing structure, from the radially outermost point of the bead core and the width of the tire section being smaller than 0.6.

It is to be noted that in the present specification the expression "hysteretic loss" means the loss of energy in each cubic centimeter of composition which is required to deform a block of the composition by means of a compression force exerted in a given direction to 9/10 of its original dimension, the block being free from links in the directions tranverse to the given direction, and then to allow the block to return to its original dimension, the cyclic deformation of the compound block and its return to the original size being carried out in about 1/50 of one second. The value of the hysteretic loss in respect of any considered compound may vary depending upon the temperature at which it is measured.

Preferably, the ratio ranges between 0.4 and 0.6.

According to a preferred embodiment of the invention, the composition forming the radially innermost layer has an index of hysteretic loss ranging between 0.002 and 0.006 Joule for each cubic centimeter of composition at 25° C. and ranging between 0.0015 and 0.004 Joule for each cubic centimeter of composition at 70° C.

According to a further preferred embodiment, the composition forming the radially innermost layer has a thickness of not less than 1.2 mm and preferably ranging between 1/9 and ¼ of the whole tread thickness.

It is to be noted that, in a cross-section of the tread, the separation line between the two layers of composition is not parallel to the outer surface of the tread; more precisely, it is parallel to the surface in the zones between two adjacent grooves. However, in proximity of the groove walls, it lowers as far as the groove bottom. It is to be understood that the above defined thickness values are referred to the portions of the separation line between two grooves and therefore parallel to the outer surface of the tread.

According to a still further preferred embodiment of the invention, the composition forming the radially innermost layer has a modulus of elasticity, at an elongation of 100%, which is not less than 15 kg/cm² and preferably ranges between 20 and 30 kg/cm².

Referring now to FIGS. 1 and 2 an inflated automobile tire has a carcass 1 constituted by cords lying in radial planes at an angle of about 90° with respect to the mid-circumferential plane of the tire. Carcass 1 extends from one bead 2 to a second bead and turns up about the respective bead cores 3.

A circumferentially substantially inextensible annular reinforcing structure 4 is disposed at the carcass top.

The reinforcing structure 4 is formed by two layers 5 and 6 of metal cords disposed at 18° to 24° with respect to the mid-circumferential plane of the tire, the cords of one layer crossing those of the other; a third layer 7 of nylon cords, preferably oriented substantially parallel to the mid-circumferential direction of the tire, is arranged on the metal layers 5 and 6.

The width of layer 6 is slightly smaller than that of layer 5 to allow a normal graduation between them; the width of layer 7 is of the same order as that of layer 5; however, the width of layer 7 can be larger or smaller according to the performance required of the tire.

The width Lr of the entire annular reinforcing structure is of the same order of magnitude as the width of the tire tread, i.e. Lr can vary insignificantly from it. Therefore, the lateral edge ends 8 of the annular reinforcing structure 4 lie in correspondence of the shoulder 9 of the tread 10.

Tread 10, comprising two radially superimposed layers 11 and 12 of rubber composition is arranged in a radially outer position with respect to the annular reinforcing structure 4.

The layer 12, provided with grooves and blocks forming the tread pattern, has a width which is substantially equal to the width Lb of the tread; the layer 11 has a width Ls larger than that of layer 12 and may be connected to the tire sidewall by an intermediate composition not illustrated in the drawing.

Alternatively, the widths of layers 11 and 12 can be the same; in that case the connections of the layers with the sidewall can be carried out by means of an intermediate layer of rubber composition.

The tread 10 is provided with grooves 13 having a depth 1; the whole tread thickness is S, S being larger than 1. The layer 11 has a thickness S1 not smaller than 1/9 of S, preferaby ranging between 1/9 and ¼ of S, and not smaller than 1.2 mm.

FIG. 1 shows the separation line 14 between layers 11 and 12; this line has a zone between two adjacent grooves, which is substantially parallel to the outer surface of the tread; in the proximity of the grooves, the separation line 14 becomes lower to reach the bottom of the grooves. In this way, the groove bottom is formed of the same composition which forms layer 12.

The measurement of the thickness of layer 11 is in the zone between two adjacent grooves, in which the separation line 14 is substantially parallel to the outer surface of tread 10.

The layer 12 of the tread 10 which will contact the road surface as the tire rolls thereon is formed of a conventional composition used to build up tire treads, namely one having a high resistance to abrasion, tear and cracks and good traction properties on dry and wet ground.

By way of example, the composition can be made of styrene butadiene rubber of various (SBR) types, or of other polymers mixed with the SBR.

Of course, the basic copolymer is compounded with those ingredients which are necessary to impart to the composition used to form layer 12 the desired characteristics.

The following table indicates two examples of compositions which are suitable for forming layer 12 of the tread, together with some physical characteristics of the compound in its cured condition.

TABLE 1

| (All parts are parts by weight) | | |
|---|---|---|
| Composition | A | B |
| SBR with 25% styrene | 50 | — |
| SBR with 25% styrene, extended with 37.5 parts of oil | 50 | — |
| SBR with 40% styrene | — | 100 |
| Carbon black N 375 | 60 | 60 |
| Mineral oil | 10 | 12 |
| Stearic acid | 2 | 2 |
| Zinc oxide | 2 | 2 |
| Antidegradant | 2.5 | 2.5 |
| Cyclohexylbenzylthiazylsulphonamide | 1.8 | 1.0 |
| Sulphur | 1.4 | 1.4 |
| ISO hardness | 68 | 66 |
| Elasticity modulus 100% (kg/cm²) | 22 | 16 |
| Tensile strength (kg/cm²) | 180 | 160 |
| Ultimate elongation (%) | 480 | 510 |
| Index of hysteretic loss at 25° C. (J/cm³) | 0.045 | 0.060 |
| Index of hysteretic loss at 70° C. (J/cm³) | 0.020 | 0.025 |

The layer 11 of the tread 10 is formed of a composition having an index of hysteretic loss of not greater than 0.01 Joule on each cubic centimeter of composition at a temperature of 25° C. and not greater than 0.006 Joule on each cubic centimeter of composition at a temperature of 70° C.; preferably, the index of hysteretic loss ranges between 0.002 and 0.006 Joule on each cubic centimeter of composition at 25° C. and between 0.0015 and 0.004 Joule on each cubic centimeter of composition at 70° C.

The modulus of elasticity of the compound, at an elongation of 100%, is not smaller than 15 Kg/cm² and is preferably between 20 and 30 Kg/cm².

The following table indicates three examples of compositions suitable for forming layer 11 of the tread and also some physical characteristics of the cured composition.

TABLE 2

| (The values are referred to parts by weight) | | | |
|---|---|---|---|
| Composition | C | D | E |
| Natural rubber | 100 | 100 | 70 |
| 1.4 cis polybutadiene | — | — | 30 |
| Carbon black N 375 | — | 23 | 45 |
| Carbon black N 660 | 35 | 23 | — |
| Mineral oil | 2 | 3 | 10 |
| Stearic acid | 2 | 2 | 3 |
| Zinc oxide | 4 | 4 | 4 |
| Antidegradant | 2.5 | 2.5 | 2.5 |
| Cyclohexylbenzyl-thiazylsulphonamide | 1 | 1.5 | 1 |
| Sulphur | 2.5 | 1.5 | 2 |

TABLE 2-continued (The values are referred to parts by weight)

| Composition | C | D | E |
|---|---|---|---|
| ISO hardness | 62 | 64 | 66 |
| Elasticity modulus 100% (Kg/cm$^2$) | 25 | 26 | 20 |
| Tensile strength (kg/cm$^2$) | 190 | 220 | 220 |
| Ultimate elongation (%) | 390 | 440 | 500 |
| Index of hysteretic loss at 25° C. (Joule/cm$^3$) | 0.0025 | 0.0040 | 0.0050 |
| Index of hysteretic loss at 70° C. (Joule/cm$^3$) | 0.0015 | 0.0025 | 0.0035 |

It has been found that the above reported limit values of the hysteretic less indices represent critical limitations on the tire performance, both as regards the problem of power absorption and as regards the resistance of the tire to lateral forces and consequently its directional control stability.

In fact, higher values do not provide appreciable improvements of the tire power absorption, while lower values reduce resistance of the composition to tears, with possible risks of ruptures, which risk is higher the more uneven the road surface.

On the other hand, lower values result in a reduction of the elastic modulus of the compound, so that the tread blocks show less resistance to deformations by the road surface; therefore, irregular wear of the tread and/or poor directional control stability of the tire can result, which would become greater the higher the tire speed.

Still with reference to FIG. 1, the tire according to the invention has a section width L which is determined by the maximum axial distance between the two sidewalls of the tire.

In general, the maximum width between sidewalls can be determined at a zone situated at about one-half of the height of the cross section of the tire.

As described above, Lr represents the width of the annular reinforcing structure, namely the axial distance between the lateral edges 8 arranged on the carcass 1 at the shoulder 9 of the tread 10.

The ratio L/H of the tire according to the invention is smaller than 0.8 and is preferably ranging between 0.4 and 0.6.

In the tire shown in FIG. 1, L is 185 mm, Lr 130 mm and H 81 mm, so that the H/L ratio is 0.43.

Some tires according to the present invention have been tested in direct comparison with conventional tires; the results obtained in these tests are reported in the following table.

TABLE 3

| Tire Series | Tread | H/L | Power absorption HP | Resistance to transverse forces-kg |
|---|---|---|---|---|
| I | One layer of compound A | 0.65 | 1.4 | 130 |
| II | Two superimposed layers (outer one compound A - inner one compound D) | 0.65 | 1.2 | 110 |
| III | Two superimposed layers (outer one compound A - inner one compound D) | 0.50 | 1.1 | 130 |
| IV | Two superimposed layers (outer one compound A - inner one compound E) | 0.45 | 1.1 | 140 |

The power absorption and the resistance to the transverse forces were measured on a machine, well known to the tire technicians, substantially formed by a driving wheel, commonly defined "test drum", against which the tire under examination is pressed under a given load; the axis of relation of the tire can be parallel to the axis of the driving wheel or inclined with respect to it. The machine measures the couples and the forces acting on the axis of the test drum and is provided with instruments for reading said parameters.

In particular, the measurements of the power absorption was carried out on a test drum having a diameter of 1.701 meters, rotating at a peripheral speed of 80 km/hour at 20° C., the axis of the tire placed on the drum being parallel to that of the latter, the tire being loaded at 90% of the maximum admissible load and being inflated at the pressure indicated by the manufacturer for the load, and the reading of the instrument being carried out when the tire temperature had settled to a constant value.

The measurement of the resistance to the transverse forces was carried out under the same conditions and with the same method adopted to the preceding test; in this case, however, the tire axis was inclined at 2° with respect to the axis of the test drum and the instrument indicated the entity of the thrust acting on the axis of the test drums.

At last, the data reported in Table 1 are the average values obtained from the examination of a wide range of tire samples of different types and sizes, all characterized by having the same H/L ratio.

The results show that the tires of the first series have a high power absorption and a satisfactory resistance to transverse forces.

The tires of the second series show a power absorption substantially less than that of the first series of tires; they have a much lower and an unsatisfactory resistance to the transverse forces.

The tires of the third and fourth series have a power absorption which is still lower than that of the second series of tires and have a resistance to the transverse forces which is of the order of that of the first series of tires.

As regards fuel consumption, the tests demonstrated that with the type of vehicle and the distance covered (about 100 km) being equal, the tires of the third and fourth series consumed 8.25 liters of fuel, against 8.65 liters with the first series of tires and 8.38 liters with the second series of tires, with a respective saving of 4.6% and 1.55%.

An explanation of these results may be that under equal service conditions, the tires having H/L 0.60 have, at their sidewalls, a bending radius which is smaller than that of tires in which H/L has a different value (for instance the tires of the second series indicated in the above Table 3.)

Consequently, the tension stresses exerted along the radial cords in the sidewall zone are less and at the same time the tension stresses exerted in the circumferential direction, in the zone of the annular reinforcing structure, are greater.

Therefore, the cords of the annular reinforcing structure are stiffer and consequently are not as likely to deform due to outer stresses exerted both in the circumferential and in the transverse direction. In other words, such cords acquire a greater resistance against these stresses.

Such increased resistance to deformations is imparted to the innermost layer of the tread and therefore also to its outermost layer, which is connected by the blocks and grooves of the tread pattern.

As a result, the whole tire top portion (annular reinforcing structure plus the two tread layers) withstands the transverse forces acting on the tire better substantially improving the tire directional control stability characteristics.

The higher resistance of the annular reinforcing structure to deformations involves, moreover, an impression area of the tire on the road surface which has a reduced length in the direction of the tire motion (the comparison being made, under equal service conditions, between the tires of the present invention and tires in which H/L is greater than the indicated value (for instance tires of the second series reported in the above Table 3).

Consequently, the distance between the point of maximum pressure below the tire impression area under static conditions and the point of maximum pressure at said area in dynamic condition (the latter point being always advanced in the direction of motion with respect to the former) is smaller.

In this way the resistant couple of the tire is lower, with less rolling resistance and therefore less power absorption.

Although the invention has been described in detail for the purpose of illustration, it is to be understood that such detail is solely for that purpose and that variations can be made therein by those skilled in the art without departing from the spirit and scope of the invention except as it may be limited by the claims.

What is claimed is:

1. A pneumatic tire for vehicle wheels which comprises a radial cord carcass, two sidewalls which determine the section width of the tire, two beads each of which comprises at least one bead core, said radial carcass cords being wound around aid bead core, a tread disposed on the carcass top, a circumferentially substantially inextensible annular reinforcing structure radially interposed between said tread and said carcass, said annular reinforcing structure having a width which is substantially equal to the width of the tread and having its lateral edges lying at the tread shoulders, said tread comprising two layers of different rubber compositions which are radially superimposed one on the other, the radially innermost layer being formed of a composition which has an index of hysteretic loss not higher than 0.010 Joule for each cubic centimeter of composition at a temperature of 25° C. and not higher than 0.006 Joule for each cubic centimeter of composition at a temperature of 70° C. and a modulus of elasticity at an elongation of 100 percent of from 20 to 30 kg per square centimeter, the ratio between the radial distance of the lateral edges of said annular reinforcing structure from the radially outermost point of the bead core, and the width of the tire section being smaller than 0.6.

2. The pneumatic tire for vehicle wheels as in claim 1, characterized in that said ratio ranges between 0.4 and 0.6.

3. The pneumatic tire for vehicle wheels of claim 1, characterized in that the composition of the radially innermost layer has an index of hysteresis loss between 0.002 and 0.006 Joule for each cubic centimeter of composition of 25° C. and between 0.0015 and 0.004 Joule for each cubic centimeter of composition at 70° C.

4. The pneumatic tire of claim 3, characterized in that the composition of the radially innermost layer has a thickness of not less than 1/9 of the whole tread thickness.

5. The pneumatic tire of claim 4, characterized in that the composition of the radially innermost layer has a thickness of 1/9 to ¼ of the entire tread thickness.

6. A pneumatic tire for a motor vehicle comprising:
opposite sidewalls which determine the width of the tire and have annular radially inner and outer edges;
a carcass comprising radial cords which extends between said outer edges of the sidewalls;
an annular bead disposed adjacent to said inner edge of each sidewall;
a bead core disposed in each bead;
a tread band disposed on the carcass and integral with a shoulder which is integral with a sidewall;
an annular reinforcing structure disposed between the carcass and tread band, having a width about equal to the width of the tread band, and having an annular edge disposed in each shoulder, said tread band comprising two layers of different composition disposed one on the other, the radially inner layer of the tread band having a hysteretic loss index of not more than 0.01 Joule per cubic centimeter at about 25° C. and not more than 0.006 Joule per cubic centimeter at about 70° C. and a modulus of elastically at an elongation of 100 percent of from 20 to 30 kg per square centimeter, the ratio between the radial distance of the lateral edges of the annular reinforcing structure and the radially outermost point of the bead core and the width of the tire section being less than about 0.6.

7. The pneumatic tire of claim 6 having a ratio of sidewall height to width of the tire of less than 0.6.

* * * * *